United States Patent
Brown et al.

(10) Patent No.: US 12,462,456 B2
(45) Date of Patent: Nov. 4, 2025

(54) NON-DESTRUCTIVE GENERATIVE IMAGE EDITING

(71) Applicant: ADOBE INC., San Jose, CA (US)

(72) Inventors: Davis Taylor Brown, Seattle, WA (US); Alan Lee Erickson, Franktown, CO (US); Dana Michelle Jefferson, Astoria, NY (US); Michael Spencer Cragg, Troy, MI (US)

(73) Assignee: ADOBE INC., San Jose, CA (US)

(*) Notice: Subject to any disclaimer, the term of this patent is extended or adjusted under 35 U.S.C. 154(b) by 273 days.

(21) Appl. No.: 18/329,058

(22) Filed: Jun. 5, 2023

(65) Prior Publication Data

US 2024/0386634 A1 Nov. 21, 2024

Related U.S. Application Data

(60) Provisional application No. 63/503,057, filed on May 18, 2023.

(51) Int. Cl.
*G06T 11/60* (2006.01)
*G06F 40/166* (2020.01)

(52) U.S. Cl.
CPC ............ *G06T 11/60* (2013.01); *G06F 40/166* (2020.01)

(58) Field of Classification Search
CPC ....... G06T 11/60; G06F 40/166; G06N 20/00; G06V 10/82
See application file for complete search history.

(56) References Cited

PUBLICATIONS

Nightcafe, "Halo—Masterchief & cortana 2.0 high res", Wayback Machine SnapShot of Oct. 12, 2021. (Year: 2021).*
Tutortube, "Pixlr E Tutorial—Lesson 57—AI Auto Mask", uploaded Jun. 28, 2021 on YouTube, https://youtu.be/qSOxjT7sCfk (Year: 2021).*
Olivio Sarikas, "Midjourney Seed—Best Use! How to, Explained and Examples", uploaded Sep. 29, 2022 on Youtube, https://www.youtube.com/watch?v=ljHcfmwKj-U (Year: 2022).*
Monzon Media, "PIXLR E An Introduction To Layer Masks", uploaded Mar. 5, 2023 on YouTube, https://www.youtube.com/watch?v=lo6KIEldgFU (Year: 2023).*
Pixlr, "Pixlr 2023—AI Infill", uploaded Mar. 27, 2023 on YouTube, https://www.youtube.com/shorts/wHLRZ4ELtSw?feature=share (Year: 2023).*

\* cited by examiner

*Primary Examiner* — Kee M Tung
*Assistant Examiner* — Thang Gia Huynh
(74) *Attorney, Agent, or Firm* — F. CHAU & ASSOCIATES, LLC (57) ABSTRACT

Systems and methods for non-destructive image editing are described. Embodiments are configured to obtain, via a document editor user interface, a selection input identifying a portion of a first image displayed in the document editor user interface. According to some aspects, the first image is part of a first layer of a multilayer document. Embodiments are further configured to: obtain an image generation text prompt; generate, using an image generation network, a second image based on the first image and the image generation text prompt; and present, via a multilayer window of the document editor user interface, a first element representing the first layer of the multilayer document and a second element representing a second layer of the multilayer document. The first element includes the first image and the second element includes the second image and a mask corresponding to the portion of the first image.

20 Claims, 10 Drawing Sheets

NON-DESTRUCTIVE GENERATIVE IMAGE EDITING

CROSS-REFERENCE TO RELATED APPLICATION

This U.S. non-provisional application claims priority under 35 U.S.C. § 119 to U.S. Provisional Patent Application No. 63/503,057, filed on May 18, 2023, in the United States Patent and Trademark Office, the disclosure of which is incorporated by reference herein in its entirety.

BACKGROUND

The following relates generally to image processing, and more specifically to image generation. Generative AI, a subfield of artificial intelligence, has been increasingly integrated into creative workflows, providing a transformative impact on industries ranging from digital art and design to entertainment and advertising. Generative AI enables the synthesis of high-quality, original content. The technology utilizes deep learning models, such as Generative Adversarial Networks (GANs) and diffusion models, to learn from vast amounts of data and generate new content that mimics the input data in style and structure. As a result, generative models can create realistic images, videos, text, and even music, providing a new level of creative assistance and automation in the design process.

In image editing processes, generative AI can be used in tasks like inpainting or adding content such as objects and scene elements. Inpainting refers to the process of filling in a portion of an image with content that matches other image content surrounding the portion. By learning from millions of images, generative AI models can predict plausible content based on the surrounding context. Similarly, these models can also generate new elements to add to an image, such as creating additional background details, objects, or even characters. Accordingly, generative processes are often used in creative workflows. However, generating new content can be a destructive process, as conventional techniques involve flattening or overwriting the original image with the new content. Further, there are currently no means for navigating through prior workflow steps, or persisting the workflow steps across different sessions or users.

SUMMARY

The following describes systems and methods for non-destructive image editing. According to some aspects, an image processing apparatus obtains a user selection identifying a portion of an image. The image processing apparatus generates an output image that includes new image content within the portion using an image generation network. In some aspects, the image generation network generates additional variants of the new image content. Some embodiments of the image processing apparatus further obtain a text prompt describing the content the user wishes to generate. A multilayer document editor of the image processing apparatus may store the new image content and variants, prompts, and other information and data such as seed information in a layer referred to as a "generative layer." Accordingly, in contrast with conventional systems which flatten generated content or otherwise combine the generated content in a destructive way, the present embodiments allow for continuous editing and regeneration at each step of the creative process.

A method, apparatus, non-transitory computer readable medium, and system for image generation are described. One or more aspects of the method, apparatus, non-transitory computer readable medium, and system include obtaining, via a document editor user interface, a selection input identifying a portion of a first image displayed in the document editor user interface, wherein the first image is part of a first layer of a multilayer document; obtaining, via the document editor user interface, an image generation text prompt; generating, using an image generation network, a second image based on the first image and the image generation text prompt; and presenting, via a multilayer window of the document editor user interface, a first element representing the first layer of the multilayer document and a second element representing a second layer of the multilayer document, wherein the first element presents the first image and the second element presents the second image and a mask corresponding to the portion of the first image.

A method, apparatus, non-transitory computer readable medium, and system for image generation are described. One or more aspects of the method, apparatus, non-transitory computer readable medium, and system include obtaining, via a document editor user interface, a selection input identifying a portion of a first image displayed in the document editor user interface, wherein the first image is part of a first layer of a multilayer document; presenting, via the document editor user interface, a contextual taskbar including a generate button; upon receiving input to the generate button, generating, using an image generation network, a second image based on the first image and the selection input; and presenting, via a multilayer window of the document editor user interface, a first element representing the first layer of the multilayer document and a second element representing a second layer of the multilayer document, wherein the first element presents the first image and the second element presents the second image and a mask corresponding to the portion of the first image.

An apparatus, system, and method for image generation are described. One or more aspects of the apparatus, system, and method include at least one processor; at least one memory including instructions executable by the at least one processor; an image generation network configured to generate an output image based on an input image and a mask; and a multilayer document editor configured to generate a multilayer document comprising a first layer that includes the input image and a second layer that includes the output image and the mask.

DETAILED DESCRIPTION

In an example of a creative workflow involving generative AI, a user may begin by identifying a region of an image for inpainting or outpainting. A generative model may create few variations of plausible image content for the region. However, in conventional systems, the project is flattened to a single image such as a compressed JPG with minimal metadata. At that point in time, any other variations, prompts, or other settings the user may have tried are lost. Effectively, the history of how that image was created is lost.

The present embodiments include a non-destructive container for saving Generative AI information which may be referred to as a generative layer. By saving the prompt(s), other variations, and any settings or other metadata, embodiments can preserve the important details of the user's creative process. For creators, being able to save a log or history to come back to later to edit is very important. As well as this, being able to share a Generative Layer to others (via a multilayer document file, or otherwise) is useful to provide context as well as starting points for additional creative processes. Other creators may see the original creator's process and settings, and be able to further edit the project in a cohesive way. Some types of information may be included in a generative layer include: Prompt(s), Variations, user created or ML-model created masks, style properties, seed value, generative AI model used/version, user ID or the name of who created the content, date and time of creation, spatial information, locational information about where the layer was created in the document, sampling area, lighting information, and 3D material information.

An image processing system configured to perform non-destructive generative image editing is described with reference to FIGS. 1-7. Methods for non-destructive generative image editing, including image generation processes, are described with reference to FIGS. 8-9. A computing device configured to implement an image processing apparatus according to the present disclosure is described with reference to FIG. 10.

Image Processing System

An apparatus for image generation is described. One or more aspects of the apparatus include at least one processor; at least one memory including instructions executable by the at least one processor; an image generation network configured to generate an output image based on an input image and a mask; and a multilayer document editor configured to generate a multilayer document comprising a first layer that includes the input image and a second layer that includes the output image and the mask.

In some aspects, the multilayer document editor further comprises a global layer manager configured to display a multilayer window including a first layer element representing the first layer, a second layer element representing the second layer, and an ordering of the first layer and the second layer. Some examples further include a generative layer manager configured to display a generative layer window that includes a preview of the output image. Some examples of the apparatus, system, and method further include a taskbar component configured to display a contextual taskbar that selectively displays an image generation element comprising a text field, a variant navigation element for selecting a variant, or a generate button.

Figure 1:
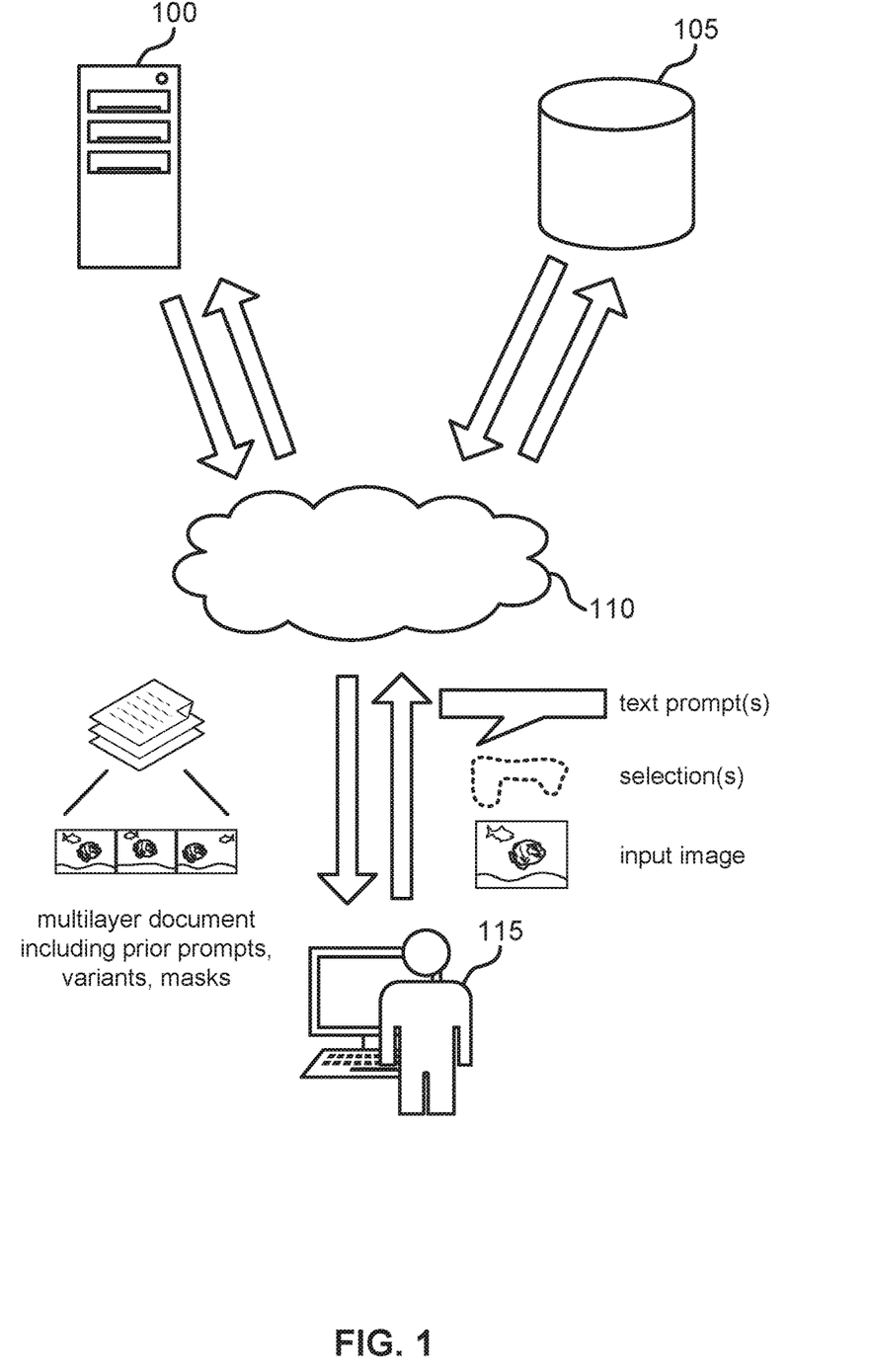
FIG. 1 shows an example of an image processing system according to aspects of the present disclosure.

FIG. 1 shows an example of an image processing system according to aspects of the present disclosure. The example shown includes image processing apparatus 100, database 105, network 110, and user 115.

Image processing apparatus 100 is an example of, or includes aspects of, the corresponding element described with reference to FIG. 2.

According to some aspects, one or more components of image processing apparatus 100 may be implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Database 105 is configured to store information used by the image processing system, such as generative models, user files, creative assets, and cached inputs and outputs. A database 105 is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

Network 110 facilitates the transfer of information between image processing apparatus 100, database 105, and user 115. In some cases, network is referred to as a "cloud". A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User 115 may interact with image processing apparatus 100 via a user interface. A user interface includes components that enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

Figure 2:
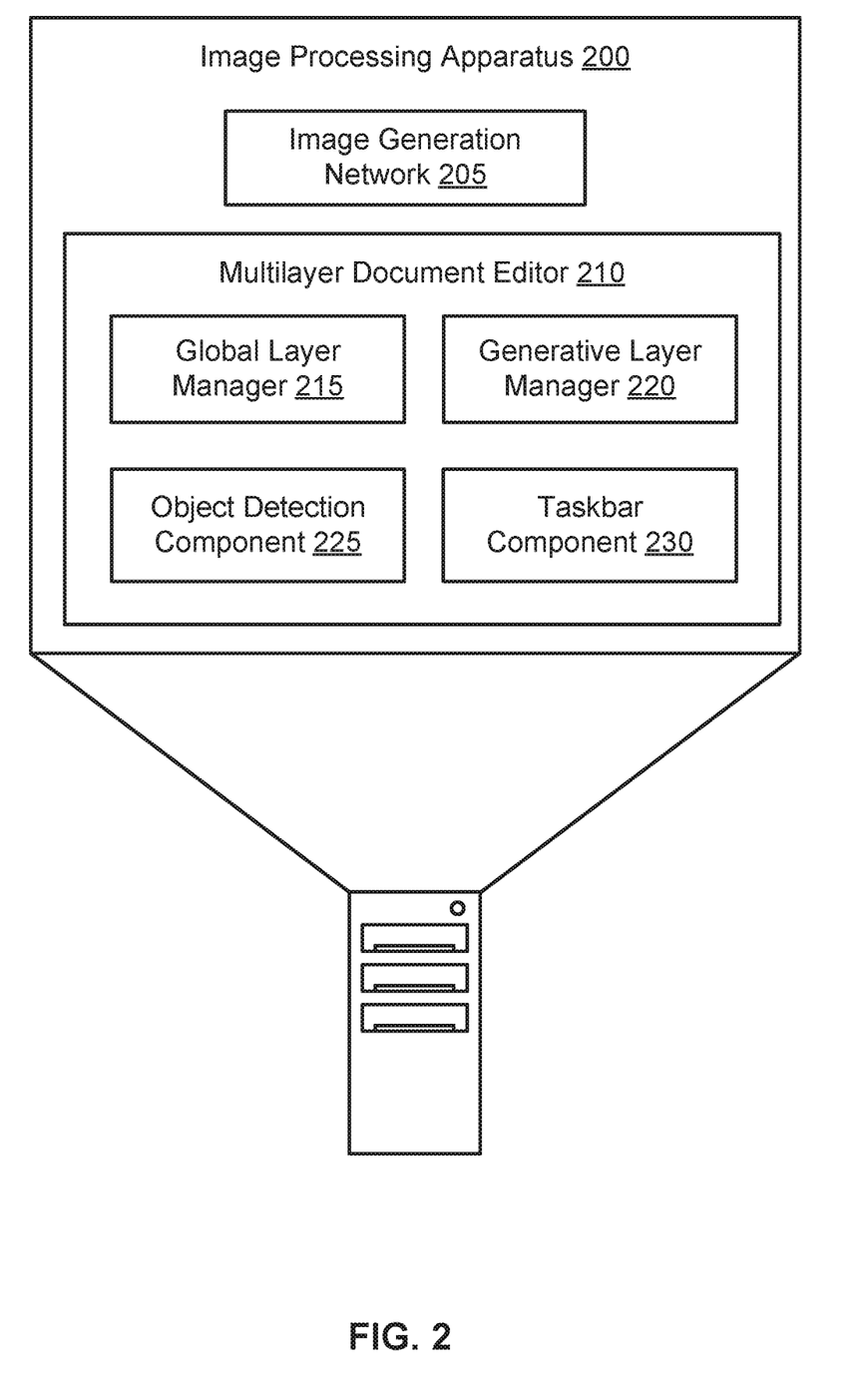
FIG. 2 shows an example of an image processing apparatus according to aspects of the present disclosure.

FIG. 2 shows an example of an image processing apparatus 200 according to aspects of the present disclosure. The example shown includes image processing apparatus 200, image generation network 205, and multilayer document editor 210. Image processing apparatus 200 is an example of, or includes aspects of, the corresponding element described with reference to FIG. 1.

Embodiments image processing apparatus 200 include several components and sub-components. These components are variously named, and are described so as to partition the functionality enabled by the processor(s) and the executable instructions included in the computing device used to image processing apparatus 200 (such as the computing device described with reference to FIG. 10). The partitions may be implemented physically, such as through the use of separate circuits or processors for each component, or may be implemented logically via the architecture of the code executable by the processors.

Image processing apparatus 200 and its subcomponents may include one or more machine learning models such as an artificial neural network. An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Image generation network 205 is configured to generate images or image content. According to some aspects, image generation network 205 generates a second image based on a first image and a selection input. In some examples, image generation network 205 generates a third image based on the first image and the selection input.

According to some aspects, image generation network 205 generates a second image based on the first image and an image generation text prompt. In some examples, image generation network 205 regenerates the second image based on an input identifying a new location or region. In some embodiments, image generation network 205 is configured to generate an image content through a reverse diffusion process. Additional detail regarding an example of an image generation network will be provided with reference to FIG. 7.

In one aspect, multilayer document editor 210 includes global layer manager 215, generative layer manager 220, object detection component 225, and taskbar component 230. Multilayer document editor 210 is configured to receive user input and display user interface elements, e.g., elements that include information from global layer manager 215, generative layer manager 220, object detection component 225, and taskbar component 230. For example, multilayer document editor 210 may display a rendering of a project the user is currently working on, such as an image or combination of images. It may further display windows, such as a multilayer window that includes all layers in a multilayer document, and a generative layer window that includes information about a currently selected generative layer. Embodiments of multilayer document editor 210 are further configured to generate or selectively display elements according to user input.

According to some aspects, multilayer document editor 210 obtains, via a document editor user interface, a selection input identifying a portion of a first image displayed in the document editor user interface, where the first image is part of a first layer of a multilayer document. In some examples, multilayer document editor 210 obtains, via the document editor user interface, an image generation text prompt. In some examples, multilayer document editor 210 displays a composite image representing the multilayer document, where the composite image is based on the first image and the second image. In some examples, multilayer document editor 210 receives a translation input. In some examples, multilayer document editor 210 modifies the location of the second image with respect to the first image based on the translation input.

Global layer manager 215 is a configured to store and manage layers in a user's project; e.g., layers of a multilayer document. According to some aspects, global layer manager 215 presents, via a multilayer window of the document editor user interface, a first element representing the first layer of the multilayer document and a second element representing a second layer of the multilayer document, where the first element presents the first image and the second element presents the second image and a mask corresponding to the portion of the first image. In some aspects, the multilayer window indicates an ordering of the first layer and the second layer. Additional detail regarding an example of a global layer manager will be provided with reference to FIGS. 3-6.

Generative layer manager 220 is configured to display properties of a generative layer, such as the second layer mentioned above. Generative layer manager 220 may selectively display a generative layer window. For example, when a user generates new content, the apparatus may select a generative layer corresponding to the generated content within a global layer window, and a generative layer window displaying properties of the selected generative layer may be presented alongside the global layer window. The generative layer window may display information from a user's creative process, such as prompt(s), variations of generated content, a time-stamp of the generated content, seeds corresponding to different variations of generated content, and meta information.

Object detection component 225 is configured to process image content and identify objects. Embodiments of object detection component 225 may include a CNN or vision transformer based neural network, and/or may use rule-based computer vision techniques. In some embodiments, object detection component 225 identifies objects within image content generated by image generation network 205.

According to some aspects, object detection component 225 identifies an object in the second image generated by image generation network 205. In some examples, object detection component 225 generates a subject mask of the object, where the second layer includes the subject mask. In some examples, additional generations from image generation network 205 are based on the subject mask.

According to some aspects, taskbar component 230 displays a contextual taskbar that includes a text prompt field, a variant navigation element for selecting a variant, a "generate" button, or a combination thereof. In some cases, the contextual taskbar includes different interactive elements based on a user's inputs. For example, the variant navigation element may be displayed after a user has pressed the generate button and variants have been generated. In some embodiments, the text prompt field includes a description about the prompt field when empty, such as "Describe the content you wish to generate" or similar. In some embodiments, the text prompt field may indicate a suggested prompt that is based on the user's selection.

In some embodiments, the text entered into the field is encoded into a conditional embedding that is used by the generative model to condition the image generation. In some cases, when the field is empty, a default conditional embedding is used that may be a random sample from a distribution or may be determined from the input image. Additional detail regarding the conditional generation will be provided with reference to FIGS. 7-8.

Figure 3:
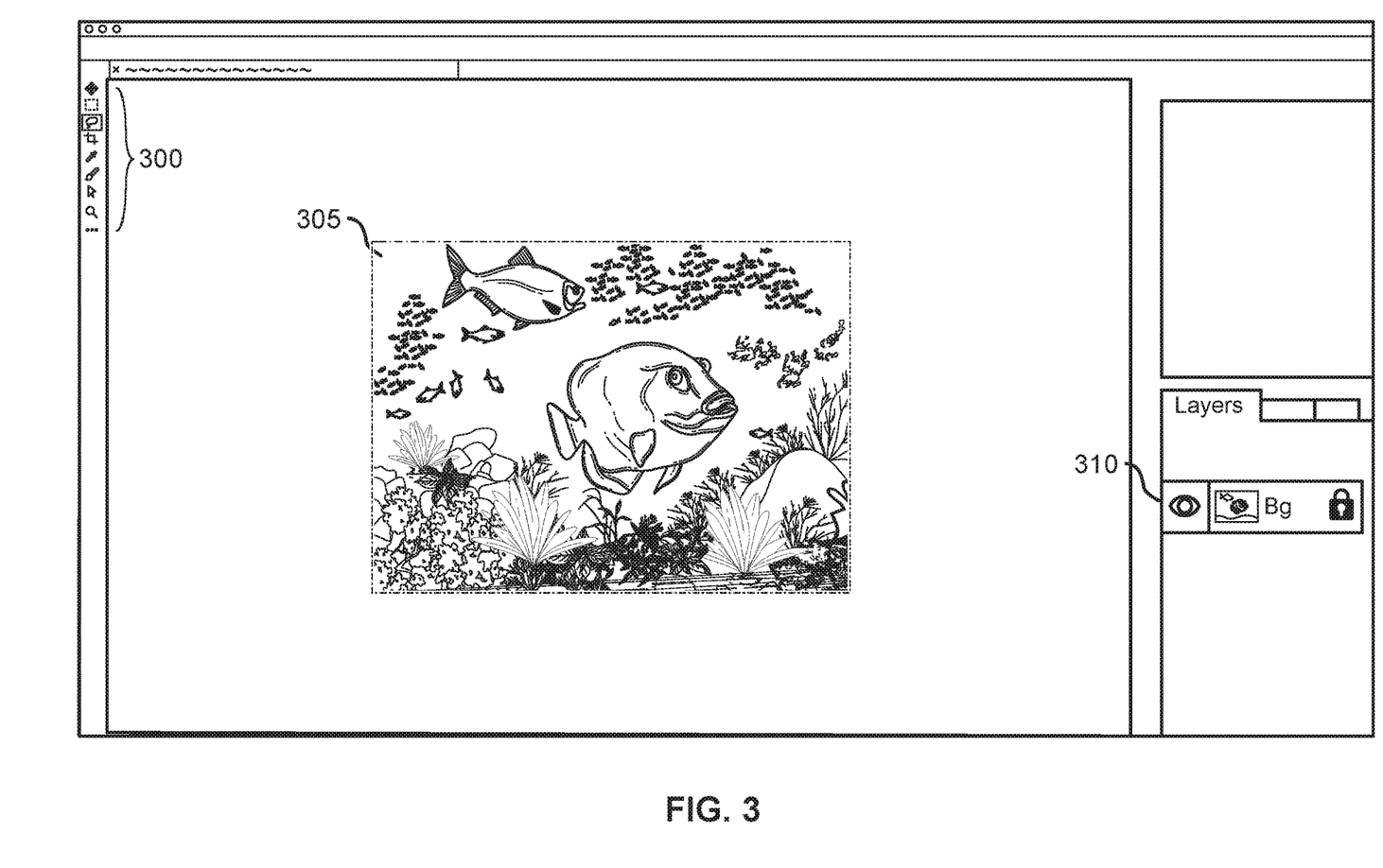
FIG. 3 shows an example of a multilayer document editor according to aspects of the present disclosure.
Figure 4:
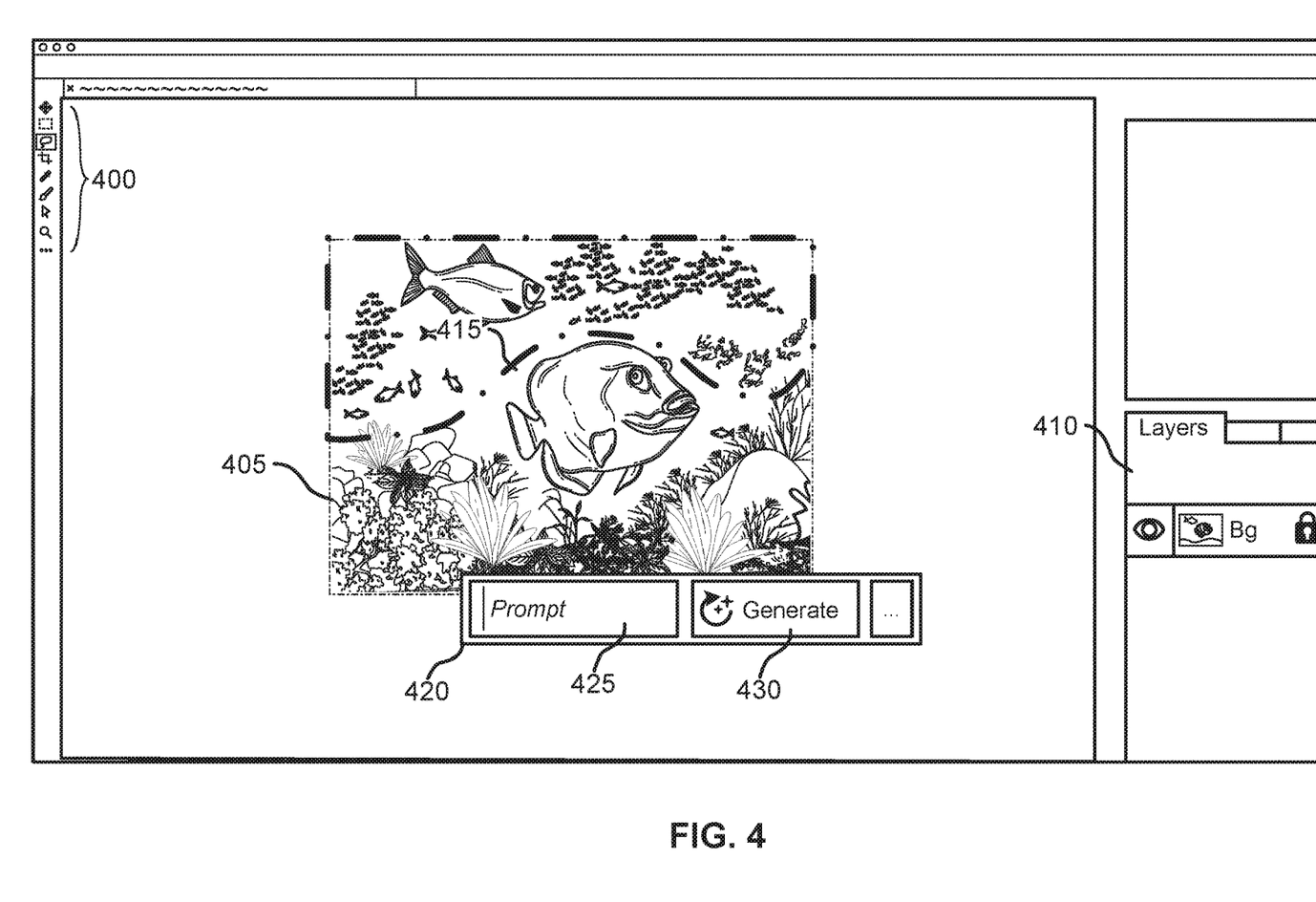
FIG. 4 shows an example of a multilayer document editor with a contextual taskbar according to aspects of the present disclosure.
Figure 5:
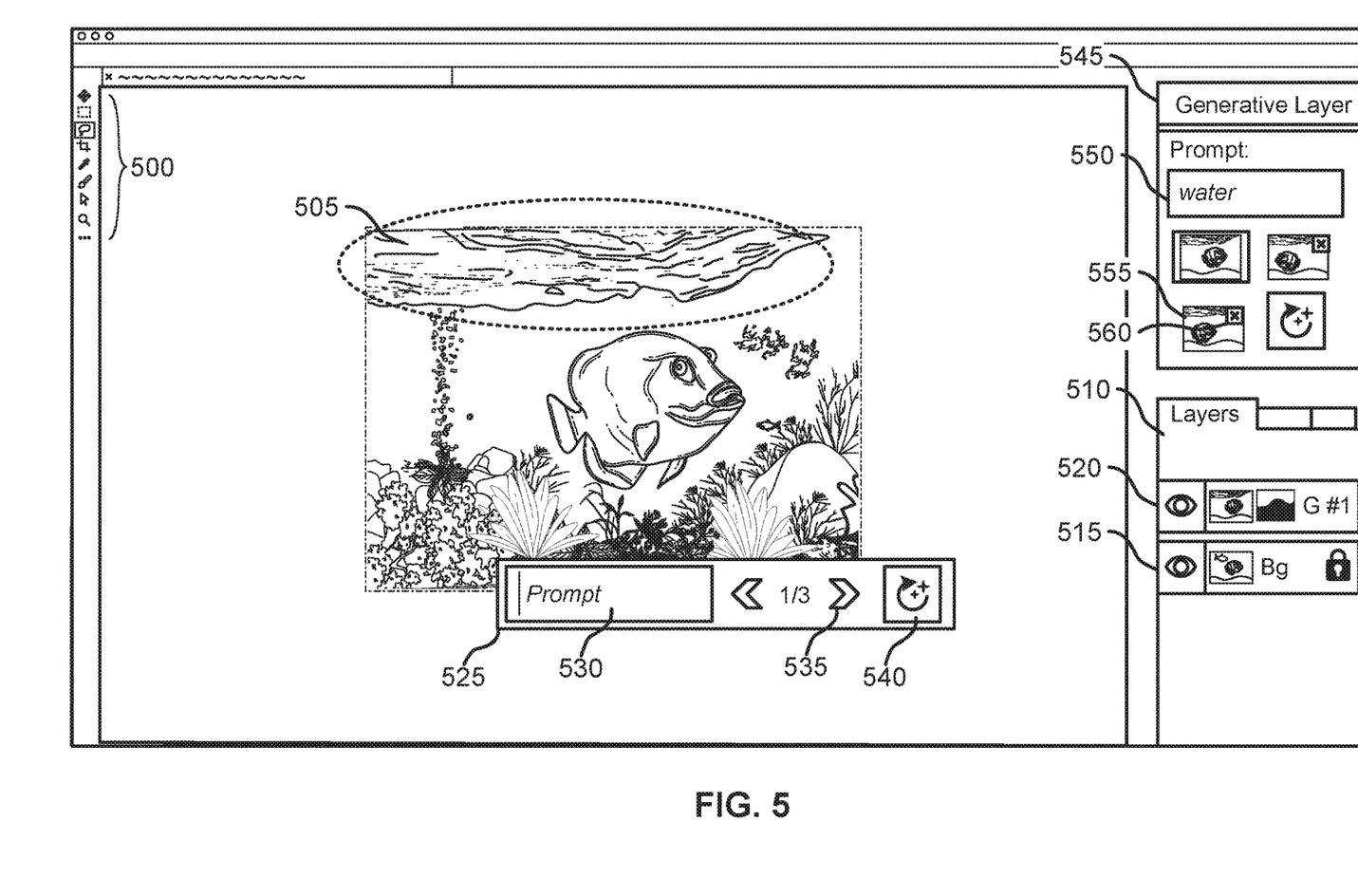
FIG. 5 shows an example of a multilayer document editor with a generative layer window according to aspects of the present disclosure.

FIGS. 3-5 illustrate various steps in an example image editing process. In these examples, a user may generate image content without providing a text prompt.

FIG. 3 shows an example of a multilayer document editor according to aspects of the present disclosure. The example shown includes tool set 300, input image 305, and multilayer window 310. Multilayer window 310 is an example of, or includes aspects of, the corresponding element described with reference to FIGS. 4-6.

Tool set 300 includes a plurality of tools that are selectable by a user for use during an image editing process. In the example shown, a free-form selection tool, sometimes referred to as a "Lasso" tool, is currently selected. This particular tool enables a user to draw a boundary around a region of an image.

Input image 305 refers to a starting image in the image editing process. In the example shown, no edits or generations have yet been performed.

Multilayer window 310 is configured to display elements corresponding to one or more layers in a multilayer document. In the example shown, multilayer window 310 displays a first element that includes an icon representing input image 305. According to some aspects, multilayer window 310 is controlled by a global layer manager such as the one described with reference to FIG. 2.

FIG. 4 shows an example of a multilayer document editor with a contextual taskbar 420 according to aspects of the present disclosure. The example shown includes tool set 400, input image 405, multilayer window 410, selection 415, and contextual taskbar 420.

Multilayer window 410 is an example of, or includes aspects of, the corresponding element described with reference to FIGS. 3, 5, and 6. Contextual taskbar 420, prompt field 425, and generate button 430 are examples of, or include aspects of, the corresponding elements described with reference to FIGS. 5 and 6.

In the example shown with reference to FIG. 4, a user has provided selection 415 to the system. In some cases, a user may create selection 415 using a free-form selection tool from tool set 400.

According to some aspects, upon receiving selection 415, the system may present contextual taskbar 420. In one aspect, contextual taskbar 420 includes prompt field 425 and generate button 430. In some examples, a user may enter a text prompt into prompt field 425 which describes content they wish to generate within selection 415. In the present example, a user may leave prompt field 425 blank, in which case the system may generate image content without a prompt upon receiving input to generate button 430.

FIG. 5 shows an example of a multilayer document editor with a generative layer window 545 according to aspects of the present disclosure. The example shown includes tool set 500, output content 505, multilayer window 510, contextual taskbar 525, and generative layer window 545. Prompt 550, variant 555, and delete button 560 are examples of, or include aspects of, the corresponding elements described with reference to FIG. 6.

FIG. 5 illustrates a state of a multilayer document editor after a user has provided an input to generate additional content. The generated content may be overlaid onto the previous selection as illustrated by output content 505, which includes imagery of bubbles instead of the prior imagery of fish. In this example, multilayer window 510 may now include both first element 515 and second element 520, which indicate first and second layers, respectively. The second layer may be a generative layer. In the example shown, second element 520 presents content of the generated image as well as the mask used for the generation.

Generative layer window 545 is configured to display information about a selected generative layer. In one aspect, generative layer window 545 includes prompt 550, variant 555, and delete button 560. Prompt 550 may display the prompt used for the generated content corresponding to the selected generative layer. In some examples, such as the one shown with reference to FIG. 5, prompt 550 may include a suggested prompt.

Variant 555 is an additional image generated by the system based on the prior selected region and optional text prompt. Variant 555 and additional variants may be stored as properties of the generative layer, and may be displayed as elements within generative layer window 545. According to some aspects, the elements may include delete button 560, which allows a user to remove the variants from the generative layer.

The generative layer as represented by second element 520 of multilayer window 510 and by generative layer window 545 may include additional properties. For example, the generative layer may include: prompt(s), variations, user-created or ML-model created masks, style properties, seed values, generative AI models used and their versions, user IDs or the name of the user who created the content, date and time of creation, spatial information, locational information about where the layer was created in the document, sampling area, lighting information, and 3D material information. In some embodiments, one or more these additional properties may be displayed in generative layer window 545.

Contextual taskbar 525 may include prompt field 530 and generate button 535 similarly to FIG. 4, and may further include next variant button 535. Next variant button 535 iterates through the variants in the generative layer, such as those shown in generative layer window 545.

Figure 6:
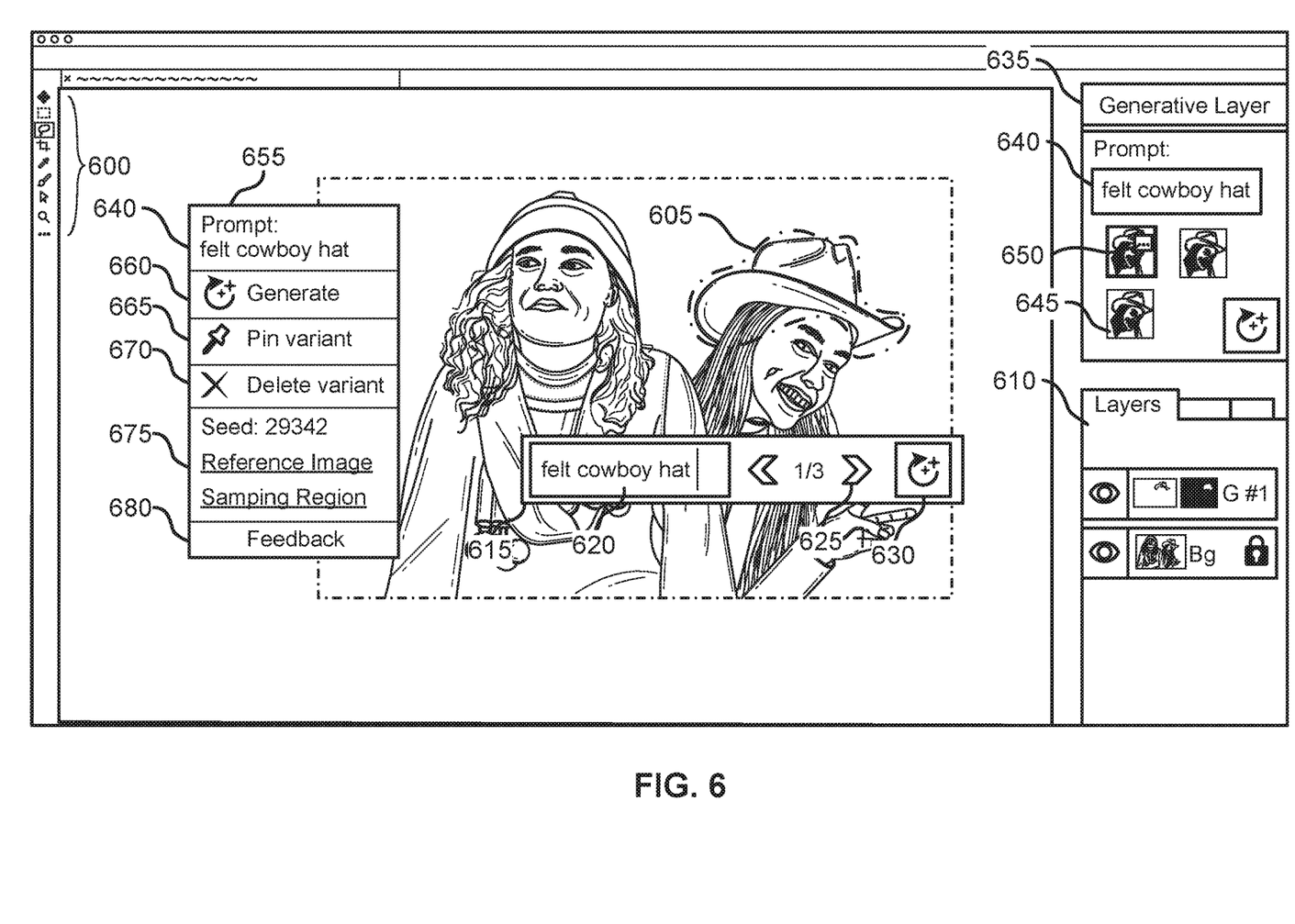
FIG. 6 shows an example of a multilayer document editor with a context menu according to aspects of the present disclosure.

FIG. 6 shows an example of a multilayer document editor with a context menu 655 according to aspects of the present disclosure. The example shown includes tool set 600, output content 605, multilayer window 610, contextual taskbar 615, generative layer window 635, and context menu 655.

FIG. 6, similarly to FIG. 5, illustrates a state of a multilayer document editor after a user has provided an input to generate additional content. Unlike FIG. 5, a user has additionally provided a prompt before generation. In this example, the prompt is "felt cowboy hat". In some aspects, the state of the multilayer document editor includes a current selection of a generative layer that includes the generated content.

In one aspect, contextual taskbar 615 includes prompt field 620, next variant 625, and generate button 630. In one aspect, generative layer window 635 includes prompt 640, variant 645, and additional options button 650. These elements are examples of, or include aspects of, the corresponding elements described with reference to FIG. 5. In one aspect, context menu 655 includes prompt 640, second generate button 660, pin button 665, delete button 670, properties 675, and feedback options 680.

In one example, a user selects additional options button 650 corresponding to a variant within generative layer window 635. Upon receiving this input, the system may display context menu 655, which includes information and options pertaining to the variant. For example, context menu 655 may include prompt 640 as a reference to the prompt that was used to generate the selected variant. Second generate button 660 is selectable to generate an additional image based on the prompt, where the additional image is stored in the generative layer. Pin button 665 is operable to "pin" the selected variant. In some cases, "pinning" holds the selected variant in place among an ordered listing of other variants. Delete button 670 is selectable to delete the currently selected variant. Properties 675 lists various information about the variant including its seed value, the image that provided its basis for generation, the mask, various metadata, or a combination thereof. Feedback options 680 is selectable to provide feedback to the system about the generation.

Figure 7:
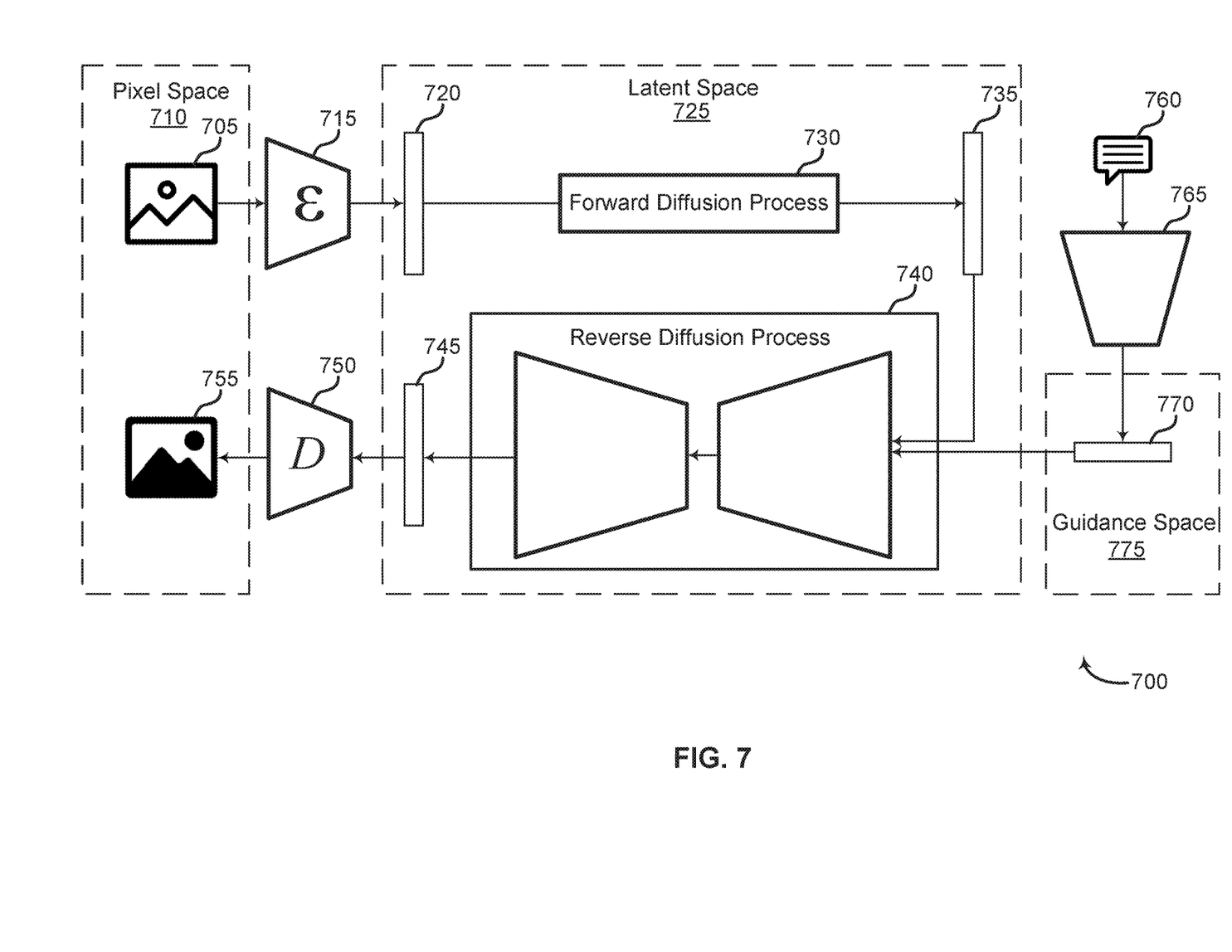
FIG. 7 shows an example of an image generation network according to aspects of the present disclosure.

FIG. 7 shows an example of an image generation network according to aspects of the present disclosure. The guided latent diffusion model 700 depicted in FIG. 2 is an example of, or includes aspects of, the image generation network described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 700 may take an original image 705 in a pixel space 710 as input and apply and image encoder 715 to convert original image 705 into original image features 720 in a latent space 725. Then, a forward diffusion process 730 gradually adds noise to the original image features 720 to obtain noisy features 735 (also in latent space 725) at various noise levels.

Next, a reverse diffusion process 740 (e.g., a U-Net ANN) gradually removes the noise from the noisy features 735 at the various noise levels to obtain denoised image features 745 in latent space 725. In some examples, the denoised image features 745 are compared to the original image features 720 at each of the various noise levels, and parameters of the reverse diffusion process 740 of the diffusion model are updated based on the comparison. Finally, an image decoder 750 decodes the denoised image features 745 to obtain an output image 755 in pixel space 710. In some cases, an output image 755 is created at each of the various noise levels. The output image 755 can be compared to the original image 705 to train the reverse diffusion process 740.

In some cases, image encoder 715 and image decoder 750 are pre-trained prior to training the reverse diffusion process 740. In some examples, they are trained jointly, or the image encoder 715 and image decoder 750 and fine-tuned jointly with the reverse diffusion process 740.

The reverse diffusion process 740 can also be guided based on a text prompt 760, or another guidance prompt, such as an image, a layout, a segmentation map, a mask as described with reference to FIG. 3, a default embedding in absence of a text prompt, etc. The text prompt 760 can be encoded using a text encoder 765 (e.g., a multimodal encoder) to obtain guidance features 770 in guidance space 775. According to some aspects, an image generation network generates guidance features 770 by incorporating information from an input image. The guidance features 770 can be combined with the noisy features 735 at one or more layers of the reverse diffusion process 740 to ensure that the output image 755 includes content described by the text prompt 760. For example, guidance features 770 can be combined with the noisy features 735 using a cross-attention block within the reverse diffusion process 740.

Non-Destructive Generative Image Editing

A method for image generation is described. One or more aspects of the method include obtaining, via a document editor user interface, a selection input identifying a portion of a first image displayed in the document editor user interface, wherein the first image is part of a first layer of a multilayer document; obtaining, via the document editor user interface, an image generation text prompt; generating, using an image generation network, a second image based on the first image and the image generation text prompt; and presenting, via a multilayer window of the document editor user interface, a first element representing the first layer of the multilayer document and a second element representing a second layer of the multilayer document, wherein the first element presents the first image and the second element presents the second image and a mask corresponding to the portion of the first image.

Some examples of the method, apparatus, non-transitory computer readable medium, and system further include storing the second image, the image generation text prompt, and the mask as properties of the second layer. Some examples further include generating a third image based on the first image and the image generation text prompt. Some examples further include storing the third image in the second layer, wherein the second layer includes the second image and the third image as properties. Some examples further include identifying an object in the second image. Some examples further include generating a subject mask of the object, wherein the second layer includes the subject mask. Some examples of the method, apparatus, non-transitory computer readable medium, and system further include presenting a generative layer window of the document editor user interface upon receiving a selection of the second element wherein the generative layer window indicates the properties of the second layer.

Some examples of the method, apparatus, non-transitory computer readable medium, and system further include obtaining a first seed value, wherein the second image is generated based on the first seed value. Some examples further include obtaining a second seed value, wherein the third image is generated based on the second seed value. Some examples further include storing the first seed value and the second seed value as properties of the second layer.

Some examples of the method, apparatus, non-transitory computer readable medium, and system further include displaying a composite image representing the multilayer document, wherein the composite image is based on the first image and the second image. Some examples further include receiving a translation input. Some examples further include modifying the location of the second image with respect to the first image based on the translation input. Some examples further include regenerating the second image based on the modified location.

Some examples of the method, apparatus, non-transitory computer readable medium, and system further include displaying a contextual taskbar that includes an image generation element comprising a text field, a variant navigation element for selecting a variant, or a generate button. In some aspects, the system displays the contextual taskbar upon selecting a generative layer from among layers in a multilayer window. In some cases, the system displays the contextual taskbar automatically after a user has made a selection of a region in the first image, or after new image content is generated.

Embodiments further include a method that does not utilize a text prompt. One or more aspects of the method include obtaining, via a document editor user interface, a selection input identifying a portion of a first image displayed in the document editor user interface, wherein the first image is part of a first layer of a multilayer document; presenting, via the document editor user interface, a contextual taskbar including a generate button; upon receiving input to the generate button, generating, using an image generation network, a second image based on the first image and the selection input; and presenting, via a multilayer window of the document editor user interface, a first element representing the first layer of the multilayer document and a second element representing a second layer of the multilayer document, wherein the first element presents the first image and the second element presents the second image and a mask corresponding to the portion of the first image.

Embodiments of an image processing apparatus include an image generation network, such as the one described with reference to FIGS. 2 and 7. In some embodiments, the image generation network is configured to generate images using a diffusion process.

Figure 8:
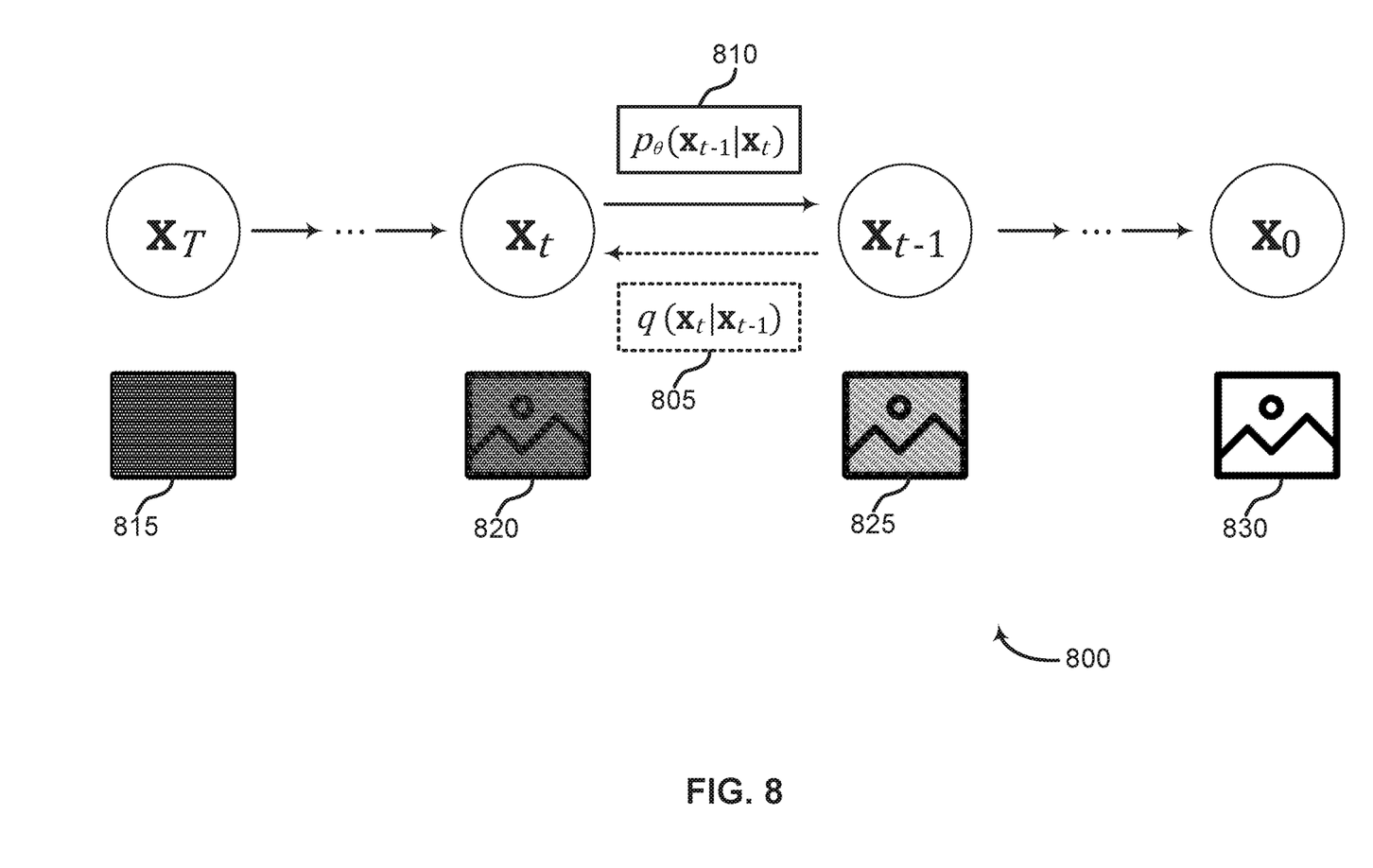
FIG. 8 shows an example of a diffusion process according to aspects of the present disclosure.

FIG. 8 shows a diffusion process 800 according to aspects of the present disclosure. As described above with reference to FIG. 7, a diffusion model can include both a forward diffusion process 705 for adding noise to an image (or features in a latent space) and a reverse diffusion process 710 for denoising the images (or features) to obtain a denoised image. The forward diffusion process 705 can be represented as $q(x_t|x_{t-1})$, and the reverse diffusion process 710 can be represented as $p(x_{t-1}|x_t)$. In some cases, the forward diffusion process 705 is used during training to generate images with successively greater noise, and a neural network is trained to perform the reverse diffusion process 710 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 710, the model begins with noisy data $x_T$, such as a noisy image 715 and denoises the data to obtain the $p(x_{t-1}|x_t)$. At each step t−1, the reverse diffusion process 710 takes $x_t$, such as first intermediate image 720, and t as input. Here, t represents a step in the sequence of transitions associated with different noise levels. The reverse diffusion process 710 outputs $x_{t-1}$, such as second intermediate image 725 iteratively until $x_T$ is reverted back to $x_0$, the original image 730. The reverse process can be represented as:

$$p_\theta(x_{t-1}|x_t) := N\left(x_{t-1}; \mu_\theta(x_t, t), \sum\nolimits_\theta (x_t, t)\right). \quad (1)$$

The joint probability of a sequence of samples in the Markov chain can be written as a product of conditionals and the marginal probability:

$$x_T: p_\theta(x_{0:T}) := p(x_T) \prod\nolimits_{t=1}^{T} p_\theta(x_{t-1}|x_t), \quad (2)$$

where $p(x_T)=N(x_T;0,I)$ is the pure noise distribution as the reverse process takes the outcome of the forward process, a sample of pure noise, as input and $\Pi_{t=1}^{T} p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data x̃ is mapped back into the pixel space from the latent space as output. In some examples, $x_0$ represents an original input image with low image quality, latent variables $x_1, \ldots, x_T$ represent noisy images, and x̃ represents the generated image with high image quality.

Figure 9:
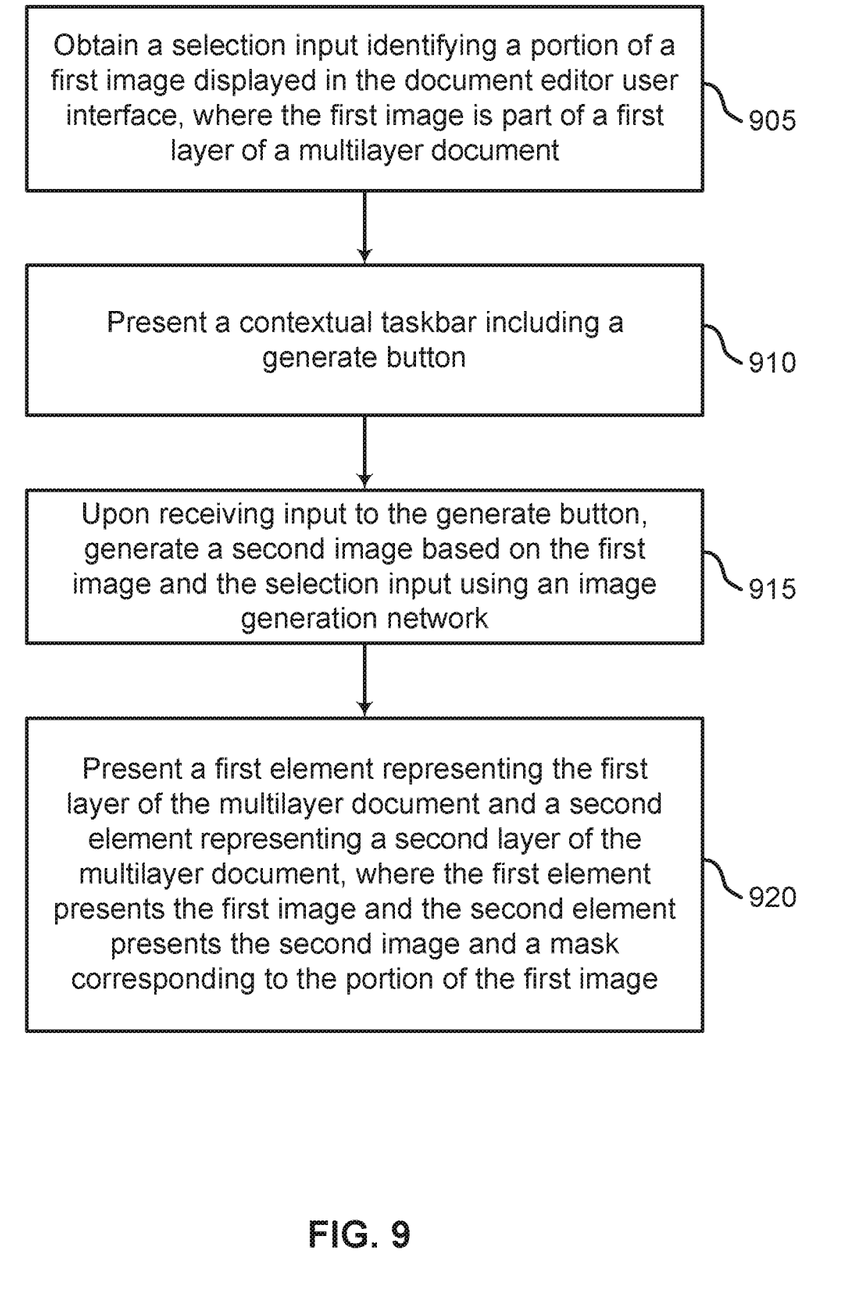
FIG. 9 shows an example of a method for non-destructive generative image editing according to aspects of the present disclosure.

FIG. 9 shows an example of a method 900 for non-destructive generative image editing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains a selection input identifying a portion of a first image displayed in the document editor user interface, where the first image is part of a first layer of a multilayer document. For example, a user may create the selection using a free-form selection tool as described with reference to FIG. 3.

At operation 910, the system presents a contextual taskbar including a generate button. For example, the system may present the contextual taskbar after the user has completed their creation of the selection. In some cases, the operations of this step refer to, or may be performed by, a taskbar component as described with reference to FIG. 2.

At operation 915, upon receiving input to the generate button, the system generates a second image based on the first image and the selection input using an image generation network. In some cases, the operations of this step refer to, or may be performed by, an image generation network as described with reference to FIGS. 2 and 7. According to some aspects, the image generation network may generate a second image using a diffusion process. In some cases, the diffusion process is conditioned using an embedding vector. In at least one example, where the user does not provide a text prompt, the embedding vector is a default vector such as a noise vector. In some examples, the user provides a text prompt along with the selection input, and the diffusion process is conditioned using an embedding of the text prompt.

At operation 920, the system presents a first element representing the first layer of the multilayer document and a second element representing a second layer of the multilayer document, where the first element presents the first image and the second element presents the second image and a mask corresponding to the portion of the first image. In some cases, the operations of this step refer to, or may be performed by, a global layer manager as described with reference to FIG. 2. The second element may represent a generative layer that is created by the system after generating new image content. The generative layer may store various information about the image generation, such as any prompts used for the generation, various seed values corresponding to various generated outputs, metadata, or the like.

Figure 10:
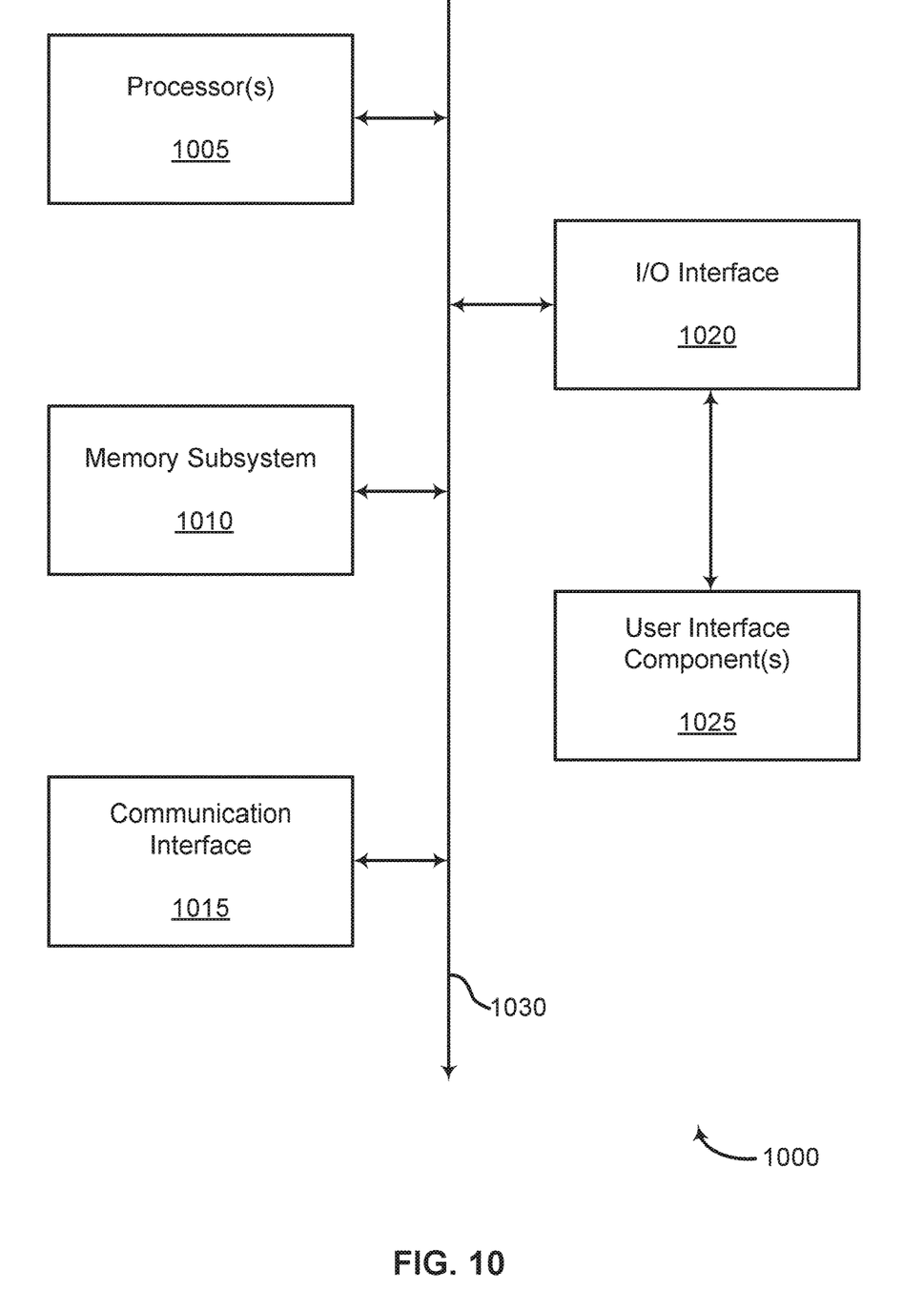
FIG. 10 shows an example of a computing device according to aspects of the present disclosure.

FIG. 10 shows an example of a computing device 1000 according to aspects of the present disclosure. The example shown includes computing device 1000, processor(s) 1005, memory subsystem 1010, communication interface 1015, I/O interface 1020, user interface component(s), and channel 1030.

In some embodiments, computing device 1000 is an example of, or includes aspects of, image processing apparatus 100 of FIG. 1. In some embodiments, computing device 1000 includes one or more processors 1005 are configured to execute instructions stored in memory subsystem 1010 to obtain, via a document editor user interface, a selection input identifying a portion of a first image displayed in the document editor user interface, wherein the first image is part of a first layer of a multilayer document; obtain, via the document editor user interface, an image generation text prompt; generate, using an image generation network, a second image based on the first image and the image generation text prompt; and present, via a multilayer window of the document editor user interface, a first element representing the first layer of the multilayer document and a second element representing a second layer of the multilayer document, wherein the first element presents the first image and the second element presents the second image and a mask corresponding to the portion of the first image.

According to some aspects, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enable a user to interact with computing device 1000. In some cases, user interface component(s) 1025 include an audio device, such as an external speaker system, an external display device such as a display screen, an input device (e.g., a remote control device interfaced with a user interface directly or through the I/O controller), or a combination thereof. In some cases, user interface component(s) 1025 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining, via a document editor user interface, a selection input identifying a portion of a first image displayed in the document editor user interface, wherein the first image is part of a first layer of a multilayer document;
obtaining, via the document editor user interface, an image generation text prompt;
generating, using an image generation network, a second image based on the first image, an input mask corresponding to the portion of the first image identified by the selection input, and the image generation text prompt;
generating a subject mask by detecting an object in the second image; and
presenting, via a multilayer window of the document editor user interface, a first element representing the first layer of the multilayer document and a second element representing a second layer of the multilayer document, wherein the first element presents the first image and the second element presents the second image and the subject mask generated based on the second image.

2. The method of claim 1, further comprising:
storing the second image, the image generation text prompt, and the input mask as properties of the second layer.

3. The method of claim 1, further comprising:
generating a third image based on the first image and the image generation text prompt; and
storing the third image in the second layer, wherein the second layer includes the second image and the third image as properties.

4. The method of claim 3, further comprising:
obtaining a first seed value, wherein the second image is generated based on the first seed value;
obtaining a second seed value, wherein the third image is generated based on the second seed value; and
storing the first seed value and the second seed value as properties of the second layer.

5. The method of claim 3, further comprising:
presenting a generative layer window of the document editor user interface upon receiving a selection of the second element wherein the generative layer window indicates the properties of the second layer.

6. The method of claim 1, wherein:
the second layer includes the subject mask.

7. The method of claim 1, further comprising:
displaying a composite image representing the multilayer document, wherein the composite image is based on the first image and the second image.

8. The method of claim 1, further comprising:
receiving a translation input; and
modifying the location of the second image with respect to the first image based on the translation input.

9. The method of claim 8, further comprising:
regenerating the second image based on the modified location.

10. The method of claim 1, further comprising:
generating a third image based on the first image; and
storing the third image in a third layer of the multilayer document.

11. The method of claim 1, wherein:
the multilayer window indicates an ordering of the first layer and the second layer.

12. The method of claim 1, further comprising:

displaying a contextual taskbar that includes an image generation element comprising a text field, a variant navigation element for selecting a variant, or a generate button.

13. A method comprising:

obtaining, via a document editor user interface, a selection input identifying a portion of a first image displayed in the document editor user interface, wherein the first image is part of a first layer of a multilayer document;

presenting, via the document editor user interface, a contextual taskbar including a generate button;

upon receiving input to the generate button, generating, using an image generation network, a second image based on the first image and an input mask corresponding to the portion of the first image identified by the selection input;

generating a subject mask by detecting an object in the second image; and presenting, via a multilayer window of the document editor user interface, a first element representing the first layer of the multilayer document and a second element representing a second layer of the multilayer document, wherein the first element presents the first image and the second element presents the second image and the subject mask.

14. The method of claim 13, further comprising:

storing the second image and the mask as properties of the second layer.

15. The method of claim 14, further comprising:

storing a seed of the second image and a reference to the first image as properties of the second layer.

16. The method of claim 13, further comprising:

generating a third image based on the first image and the input mask; and storing the third image in the second layer, wherein the second layer includes the second image and the third image as properties.

17. An apparatus comprising:

at least one processor;

at least one memory including instructions executable by the at least one processor;

the apparatus further comprising an image generation network configured to generate an output image based on an input image and an input mask corresponding to a portion of the input image identified by a selection input, and then to generate a subject mask by detecting an object in the second image; and a multilayer document editor configured to generate a multilayer document comprising a first layer that includes the input image and a second layer that includes the output image and the subject mask.

18. The apparatus of claim 17, wherein:

the multilayer document editor further comprises a global layer manager configured to display a multilayer window including a first layer element representing the first layer, a second layer element representing the second layer, and an ordering of the first layer and the second layer.

19. The apparatus of claim 17, further comprising:

a generative layer manager configured to display a generative layer window that includes a preview of the output image.

20. The apparatus of claim 17, further comprising:

a taskbar component configured to display a contextual taskbar that selectively displays an image generation element comprising a text field, a variant navigation element for selecting a variant, or a generate button.

\* \* \* \* \*